(12) United States Patent
Wang et al.

(10) Patent No.: US 10,955,878 B2
(45) Date of Patent: Mar. 23, 2021

(54) PORTABLE ELECTRONIC APPARATUS

(71) Applicant: CHICONY ELECTRONICS CO., LTD., New Taipei (TW)

(72) Inventors: Yi-Hung Wang, New Taipei (TW); Tsung-Min Chen, New Taipei (TW); Ming-Cheng Yang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 177 days.

(21) Appl. No.: 16/026,717

(22) Filed: Jul. 3, 2018

(65) Prior Publication Data

US 2019/0196552 A1 Jun. 27, 2019

Related U.S. Application Data

(60) Provisional application No. 62/610,376, filed on Dec. 26, 2017.

(51) Int. Cl.
| | |
|---|---|
| *G06F 1/16* | (2006.01) |
| *G06F 3/02* | (2006.01) |
| *G06F 3/023* | (2006.01) |
| *G06F 3/0354* | (2013.01) |

(52) U.S. Cl.
CPC ............ *G06F 1/1669* (2013.01); *G06F 1/169* (2013.01); *G06F 1/1616* (2013.01); *G06F 1/1671* (2013.01); *G06F 3/023* (2013.01); *G06F 3/0221* (2013.01); *G06F 3/03547* (2013.01)

(58) Field of Classification Search
None
See application file for complete search history.

(56) References Cited

U.S. PATENT DOCUMENTS

| | | | |
|---|---|---|---|
| 6,104,604 A * | 8/2000 | Anderson | G06F 1/1616 361/679.08 |
| 2004/0226248 A1* | 11/2004 | Wu | H01H 13/70 52/600 |

(Continued)

FOREIGN PATENT DOCUMENTS

| | | |
|---|---|---|
| TW | M303566 | 12/2006 |
| TW | I299131 | 7/2008 |
| TW | I306614 | 2/2009 |

*Primary Examiner* — Brian M Butcher
(74) *Attorney, Agent, or Firm* — Muncy, Geissler, Olds & Lowe, P.C.

(57) ABSTRACT

The present invention discloses a portable electronic apparatus, which includes a cover casing, a base casing, a first input module and a second input module. The base casing is pivoted to the cover casing, and the base casing includes a containing portion and at least one first connecting portion. The containing portion is located on the base casing, and the first connecting portion is disposed on the containing portion. The first input module and the second input module are disposed on the containing portion interchangeably, the first input module has a second connecting portion, and the second input module has a third connecting portion. When the first input module is disposed on the containing portion, the second connecting portion electrically connects to the first connecting portion. When the second input module is disposed on the containing portion, the third connecting portion electrically connects to the first connecting portion.

9 Claims, 7 Drawing Sheets

(56) References Cited

U.S. PATENT DOCUMENTS

| | | | |
|---|---|---|---|
| 2004/0233626 A1* | 11/2004 | Chang .................. | G06F 1/1662 |
| | | | 361/679.55 |
| 2007/0164879 A1* | 7/2007 | Wu ...................... | G06F 3/0202 |
| | | | 341/22 |
| 2014/0211395 A1* | 7/2014 | Lin ...................... | G06F 1/1669 |
| | | | 361/679.17 |

\* cited by examiner

PORTABLE ELECTRONIC APPARATUS

CROSS REFERENCE TO RELATED APPLICATIONS

This application claims priority of U.S. Provisional Application No. 62/610,376 filed on 26 Dec. 2017 under 35 U.S.C. § 119(e), the entire contents of all of which are hereby incorporated by reference.

BACKGROUND OF THE INVENTION

1. Field of the Invention

The present invention relates to a portable electronic apparatus; more particularly, the present invention relates to a portable electronic apparatus with interchangeable keyboards.

2. Description of the Related Art

With the growth of gaming industries, a variety of gaming-dedicated input modules, such as keyboards and mouses, are in the market now. Take a gaming keyboard for example, comparing to a general-purpose keyboard for document processing or other general matters, the main purposes of the gaming keyboard include providing a good typing feel with easy stroke feedback and rapid signal transmission, and adding extra keys for being used as special function keys or N-keys rollover, so as to provide a game player with a faster and more convenient operation.

Currently, the game player still prefers to use a desktop computer in association with a gaming keyboard to play games. For ease of portability, a gaming-dedicated laptop computer can also be found in the market, wherein its keyboard is equipped with mechanical keys in order to meet the game player's needs of a better typing feel while playing games. However, comparing to keys equipped in the membrane keyboard of a general-purpose laptop computer, the mechanical keys equipped in the gaming keyboard would occupy more mechanical space of the laptop computer due to the nature of a longer travel distance caused by the mechanical keys, which would result in a heavy, hard-to-fold and inconvenient-to-carry laptop computer, which is not ideal for the market needs, and has room for improvement. Therefore, there is a need to provide a portable electronic apparatus with interchangeable keyboards to mitigate and/or obviate the aforementioned problems.

SUMMARY OF THE INVENTION

It is an object of the present invention to provide a portable electronic apparatus, which comprises two sets of input modules (including a first input module and a second input module) equipped with different types of keyboard assemblies, wherein the first input module and the second input module are disposed on a containing portion of a base casing interchangeably, in order to solve the hard-to-fold and inconvenient-to-carry problem caused by a gaming keyboard which occupies more mechanical space of the laptop computer.

To achieve the abovementioned objects, the present invention provides a portable electronic apparatus, which comprises a cover casing, a base casing, a first input module and a second input module. The base casing is pivoted to the cover casing. The base casing includes a containing portion and at least one first connecting portion. The containing portion is located on a surface of the base casing with the surface facing the cover casing. The first connecting portion is disposed on the containing portion. The first input module and the second input module are disposed on the containing portion interchangeably. The first input module has at least one second connecting portion, and the second input module has at least one third connecting portion. When the first input module is disposed on the containing portion, the second connecting portion is electrically connected to the first connecting portion. When the second input module is disposed on the containing portion, the third connecting portion is electrically connected to the first connecting portion.

According to one embodiment of the present invention, the first input module comprises a first keyboard assembly and a first function assembly, and the second input module comprises a second keyboard assembly and a second function assembly.

According to one embodiment of the present invention, the second connecting portion is the same member as the third connecting portion.

According to one embodiment of the present invention, the first connecting portion, the second connecting portion and the third connecting portion are pogo pin connectors.

According to one embodiment of the present invention, the first connecting portion has a single pin type spring, and the second connecting portion and the third connecting portion respectively have a metal spring.

According to one embodiment of the present invention, the base casing further comprises an eject switch. When the eject switch is applied with force, the eject switch ejects the first input module or the second input module detached from the containing portion.

According to one embodiment of the present invention, the first input module comprise a first connecting member, the first containing member has the second connecting portion and a plurality of fourth connecting portions, the first keyboard assembly and the first function assembly respectively have a fifth connecting portion, the first keyboard assembly and the first function assembly are disposed on the first connecting member, and each of the fifth connecting portions is respectively and electrically connected to the fourth connecting portion.

According to one embodiment of the present invention, the second input module comprises a second connecting member, the second connecting member has the third connecting portion and a plurality of sixth connecting portions, the second keyboard assembly and the second function assembly respectively have a seventh connecting portion, the second keyboard assembly and the second function assembly are disposed on the second connecting member, and each of the seventh connecting portions is respectively and electrically connected to the sixth connecting portion.

According to one embodiment of the present invention, the first connecting member is the same member as the second connecting member.

According to one embodiment of the present invention, the first input module is a membrane keyboard, and the second input module is a gaming mechanical keyboard.

To achieve the abovementioned objects, the present invention further provides another portable electronic apparatus, which comprises a cover casing, a base casing and a first input module. The base casing is pivoted to the cover casing. The base casing includes a containing portion and at least one first connecting portion. The containing portion is located on a surface of the base casing with the surface facing the cover casing. The first connecting portion is disposed on the containing portion. The first input module is detachably disposed on the containing portion, where the first input module has at least one second connecting portion. When the first input module is disposed on the containing portion, the second connecting portion is electrically connected to the first connecting portion.

According to one embodiment of the present invention, the first input module comprises a first keyboard assembly and a first function assembly.

According to one embodiment of the present invention, the first input module comprises a keyboard controller which is electrically connected to the second connecting portion, and the keyboard controller is also electrically connected to the first function assembly for outputting signals.

According to one embodiment of the present invention, the first input module comprises a first connecting member, the first connecting member has the second connecting portion and a plurality of fourth connecting portions, the first keyboard assembly and the first function assembly respectively have a fifth connecting portion, the first keyboard assembly and the first function assembly are disposed on the first connecting member, and each of the fifth connecting portions is respectively and electrically connected to the fourth connecting portion.

As described above, the portable electronic apparatus of the present invention comprises a first input module and a second input module, and a base casing of the portable electronic apparatus has a containing portion and a first connecting portion which allow the first input module and the second input module to be disposed on the containing portion interchangeably for executing different functions, such that the portable electronic apparatus is applicable for providing multiple types of keyboard input functions, the user can interchangeably use the keyboards according to different purposes, and the portable electronic apparatus is easy-to-fold as well as convenient-to-carry.

DETAILED DESCRIPTION OF THE PREFERRED EMBODIMENT

Figure 1:
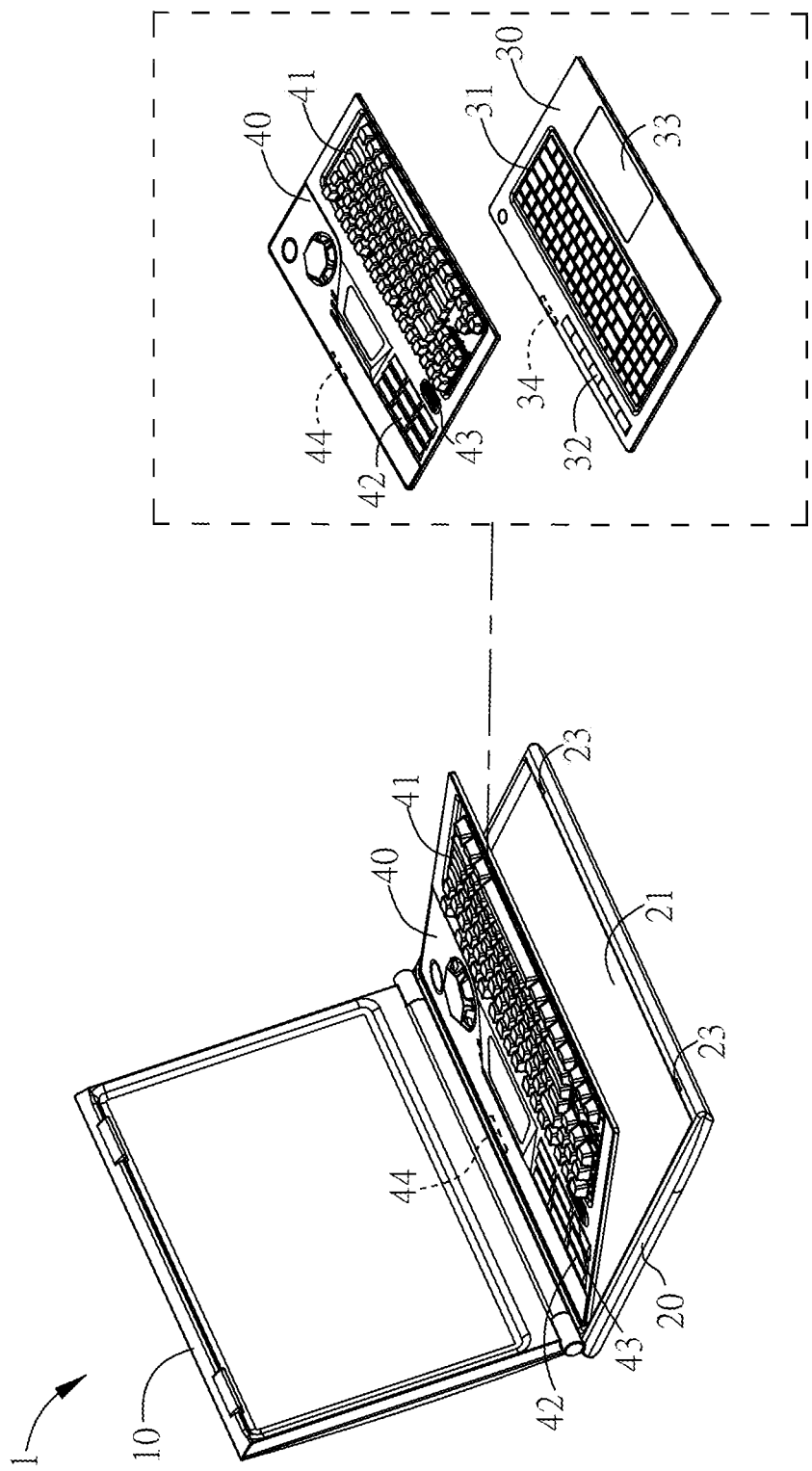
FIG. 1 illustrates a schematic drawing of a portable electronic apparatus according to a first embodiment of the present invention.
Figure 2:
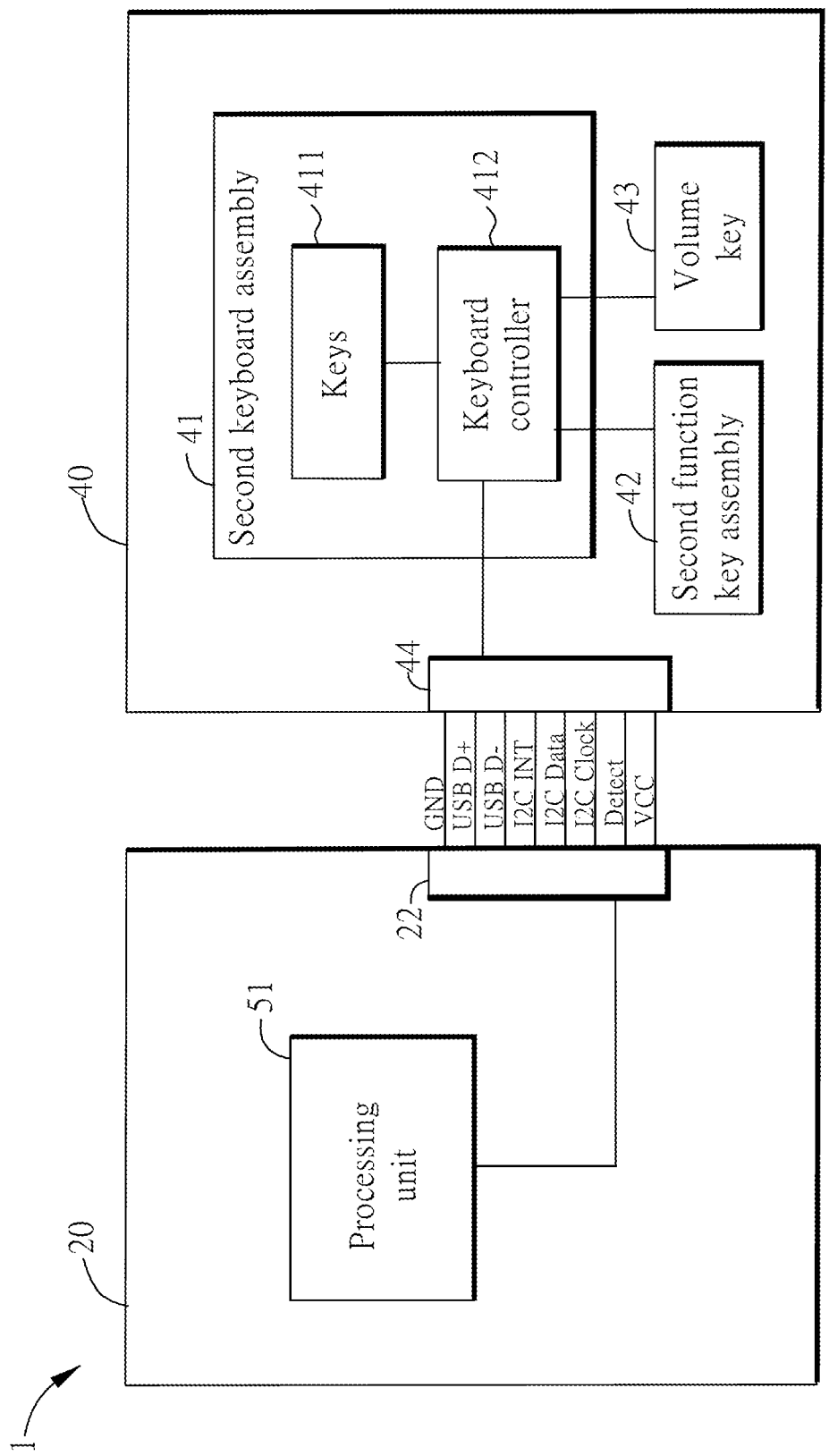
FIG. 2 illustrates a block diagram of the portable electronic apparatus as shown in FIG. 1.

For better understanding of the technical features of the present invention, preferred embodiments are described below. Please refer to both FIG. 1 and FIG. 2. FIG. 1 illustrates a schematic drawing of a portable electronic apparatus according to a first embodiment of the present invention; FIG. 2 illustrates a block diagram of the portable electronic apparatus as shown in FIG. 1. As shown in FIG. 1 and FIG. 2, a second input module 40 is disposed on a containing portion 21 as an example. In this embodiment, a portable electronic apparatus 1 comprises a cover casing 10, a base casing 20, a first input module 30 and a second input module 40. The portable electronic apparatus 1 of the present invention is a laptop computer, which comprises the cover casing 10 and the base casing 20. The base casing 20 is pivoted to the cover casing 10. That is, the cover casing 10 and the base casing 20 are pivoted to each other, such that the cover casing 10 can open and close with respect to the base casing 20. The cover casing 10 is a display screen, which is Part A and Part B so called by general laptop computer manufacturers; the base casing 20 is a base for placing primary electronic components, and is Part D so called by general laptop computer manufacturers; and the first input module 30 and the second input module 40 in this embodiment are Part C so called by general laptop computer manufacturers.

Specifically speaking, the base casing 20 comprises a containing portion 21. In the present embodiment, the containing portion 21 can be a concave portion, and the containing portion 21 is located on a surface of the base casing 20 with the surface facing the cover casing 10. In other words, the containing portion 21 is located on the surface of the base casing 20 with the surface adjacent to the side of the cover casing 10 for placing keyboards (such as the first input module 30 and the second input module 40 according to this embodiment). In the present embodiment, the first input module 30 and the second input module 40 are disposed on the containing portion 21 interchangeably. In the present embodiment, the first input module 30 is a membrane keyboard, and the second input module 40 is a gaming mechanical keyboard. As described above, the first input module 30 and the second input module 40 in the present embodiment are Part C so called by general laptop computer manufacturers; that is, Part C is a panel module dedicated for the purpose of inputting, and is composed of multiple assemblies with different functions, such as a keyboard assembly, a number key assembly or assemblies with other functions.

When a user utilizes the portable electronic apparatus 1 to perform document processing operations, the first input module 30 can be disposed on the containing portion 21. In the present embodiment, the first input module 30 is a keyboard for document processing, and is a common membrane keyboard. According to main functions required for document processing, the first input module 30 can comprise a first keyboard assembly 31 and first function assemblies 32, 33. The first keyboard assembly 31 is an input assembly composed of character input keys and partial control keys. In the present embodiment, the first function assemblies 32, 33 are a plurality of function keys and a touch panel or other input units. When the user plays games, the first input module 30 can be replaced by the second input module 40; that is, the second input module 40 would be disposed on the containing portion 21. The second input module 40 is a gaming mechanical keyboard, and can comprise a second keyboard assembly 41 and second function assemblies 42, 43 according to its function. The second keyboard assembly 41 is also an input assembly composed of character input keys and partial control keys, which are mechanical keys applicable for gaming in order to enhance its typing feel. In the present embodiment, the second function assembly 42 can be extra function keys or function keys defined by the user; and the second function assembly 43 can be a volume key designed for gaming or other input units without limiting the scope of the present invention. The user can interchangeably use the first input module 30 and the second input module 40 according to different purposes. The number of the keyboards is not limited to the embodiment of the present invention. That is, it is not limited to provide only the first input module 30 and the second input module 40; the laptop computer or keyboard manufacturers can design other types of input modules and function assemblies according to different needs, so that the user can interchangeably use them according to different purposes. When the portable electronic apparatus 1 needs to be taken out, the user can remove the comparatively thicker second input module 40 or replace it with the first input module 30, for the ease of folding and carrying the portable electronic apparatus 1.

Figure 3:
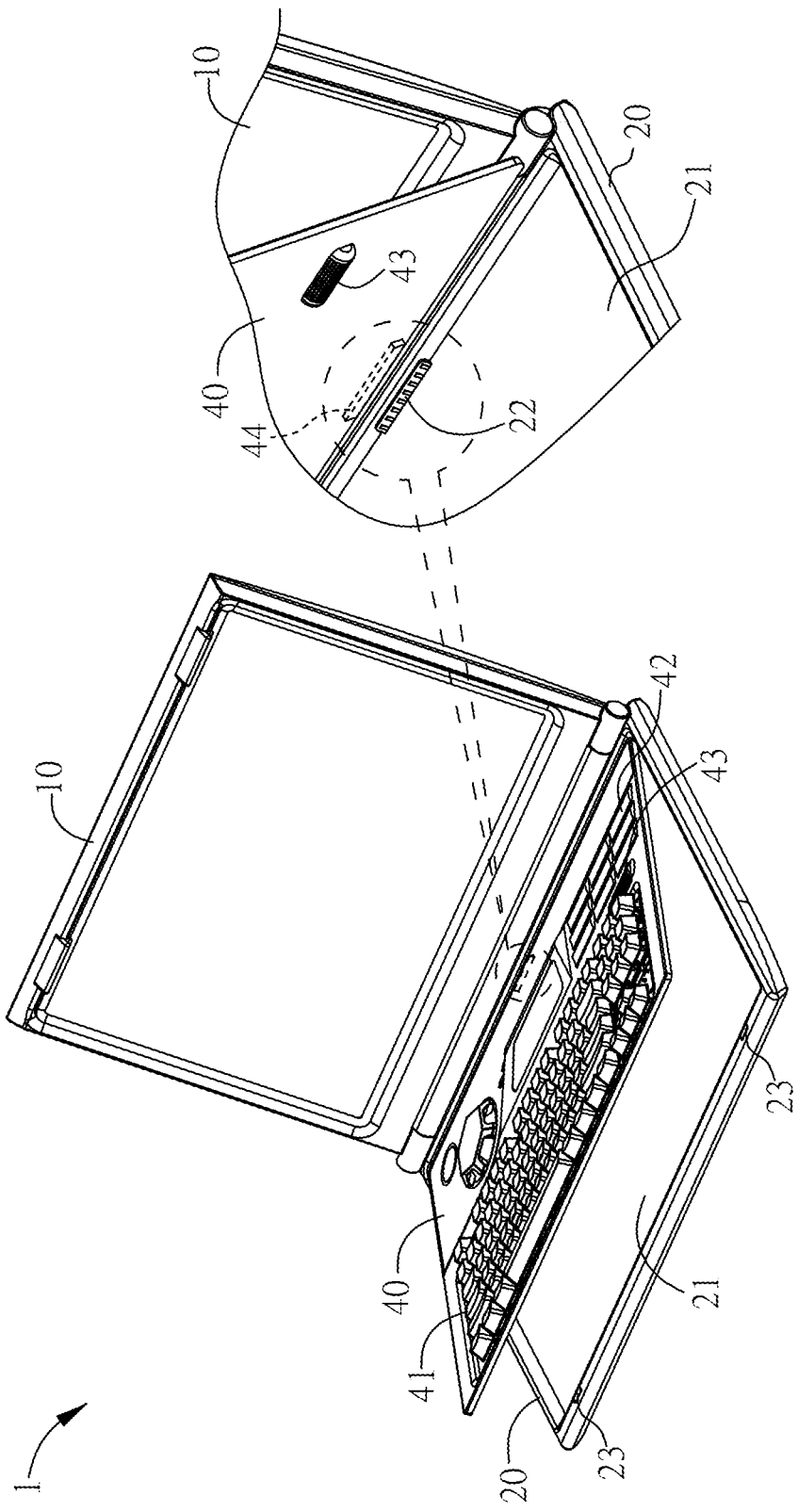
FIG. 3 illustrates an enlarged view of the schematic drawing of the portable electronic apparatus as shown in FIG. 1.

Please also refer to FIG. 3, which illustrates an enlarged view of the schematic drawing of the portable electronic apparatus as shown in FIG. 1. Specifically speaking, the base casing 20 comprises at least one first connecting portion 22. As an example, there is one first connecting portion 22 disposed on the containing portion 21 in this embodiment. Correspondingly, the first input module 30 has a second connecting portion 34 and the second input module 40 has a third connecting portion 44 in this embodiment. According to this embodiment, the first connecting portion 22 can be disposed on an inner wall of the containing portion 21, the second connecting portion 34 is correspondingly disposed on one of side walls of the first input module 30, and the third connecting portion 44 is corresponding disposed on one of side walls of the second input module 40.

When the first input module 30 is disposed on the containing portion 21, the second connecting portion 34 is electrically connected to the first connecting portion 22. By means of the electrical connection between the first connecting portion 22 and the second connecting portion 34, sensing signals or trigger signals received by the first input module 30 would be transmitted to the portable electronic apparatus 1. Further, when the second input module 40 is disposed on the containing portion 21, the third connecting portion 44 is electrically connected to the first connecting portion, such that sensing signals or trigger signals received by the second input module 40 would be transferred to a processing unit 51 of the portable electronic apparatus 1 as shown in FIG. 2.

In this embodiment, the second input module 40 comprises not only physical keys 411 but also a keyboard controller 412, which is electrically connected to the third connecting portion 44. Moreover, the keyboard controller 412 is also electrically connected to other assemblies, such as the second function assemblies 42, 43. Therefore, the keyboard controller 412 can be used for determining physical keys (including keys 411 of the second keyboard assembly 41, and physical keys of the second function assemblies 42, 43) of the second input module 40 being pressed, and for processing data input generated from pressing the keys 411, in order to output signals. In this embodiment, the outputted signal is transmitted to the processing unit 51 via the third connecting portion 44 and the first connecting portion 22. The processing unit 51 determines and executes an instruction or an execution mode corresponding to the outputted signal (such as determining whether it is a mode for the first input module 30 or for the second input module 40). In this embodiment, the processing unit 51 can also be a central processing unit of the portable electronic apparatus 1 or other dedicated operation circuit. That is, a processing circuit with computation power can also be used as the processing unit 51 of this embodiment.

Furthermore, FIG. 2 is only an example for explaining the operation of being connected to the second input module 40. The first input module 30 of the present invention also comprises a keyboard controller, which is electrically connected to the second connecting portion 34 and other assemblies (such as the first function assemblies 32, 33), such that the first input module 30 can also perform data/signal transmission with the processing unit 51.

In other embodiments, the first connecting portion 22 can also be disposed on other location of the containing portion 21, only if its location can correspond to that of the second connecting portion 34 and the third connection portion 44. For example, the first connecting portion 22 is located on one surface of the containing portion 21; therefore, correspondingly, the second connecting portion 34 is located on a bottom face of the first input module 30, and the third connecting portion 44 is also located on a bottom face of the second input module 40. When the first input module 30 or the second input module 40 is disposed on the containing portion 21, the second connecting portion 34 or the third connecting portion 44 can also be electrically connected to the first connecting portion 22 for performing data/signal transmission.

In this embodiment, the second connecting portion 34 is the same member as the third connecting portion 44, in other words, the second connecting portion 34 and the third connecting portion 44 are the same type of components, wherein the first connecting portion 22 and the second connecting portion 34 is a set of male/female connectors, and the first connecting portion 22 and the third connecting portion 44 is also a set of male/female connectors. Specifically speaking, the first connecting portion 22 can be a male connector, and thus correspondingly, the second connecting porting 34 and the third connecting portion 44 are female connectors. The first connecting portion 22, the second connecting portion 34 and the third connecting portion 44 can be, but is not limited to, connectors composed of universal serial buses (USB), inter-integrated circuit (I²C) interfaces, serial peripheral interfaces (SPI), universal asynchronous receiver-transmitters (UART) or specific pins, or any other equivalent types of connectors. Preferably, the first connecting portion 22, the second connecting portion 34 and the third connecting portion 44 can be pogo pin connectors composed of universal serial buses (USB) and inter-integrated circuits (I²C). Further, the first connecting portion 22 has a single pin type spring (such as pogo pin), and the second connecting portion 34 and the third connecting portion 44 respectively have a metal spring. By means of electrically connecting the single pin type spring to the metal spring of the pogo pin connector, signal transmission can be achieved, and the universal serial bus (USB) and inter-integrated circuit (I²C) are utilized to control the first input module 30 or the second input module 40.

For example, the pogo pin connector can be composed of pins such as GND, USB D+, USB D−, I²C INT, I²C Data, I²C Clock, Detect and VCC, wherein the power-supply pin VCC and the ground pin GND are used for power connection; the data pins USB D+ and USB D− are used for data transmission and controlling the second keyboard assembly 41 or a light-emitting unit of the second function assembly 42; the input pin I²C INT is used for waking up the portable electronic apparatus 1 when a physical key is being pressed; the input pins I²C Data and I²C Clock are used for initial setup; and the detection pin Detect is used for detecting the connection of the first input module 30 or the second input module 40.

Preferably, the base casing 20 can comprise a fixture (not shown in figures), which can be, but not limited to, a lock member, a locking rod, a socket or any other equivalent fixture, used for fixing the first input module 30 or the second input module 40 onto the containing portion 21, wherein the first input module 30 and the second input module 40 are also designed as corresponding structures with respect to the type and structural shape of the fixture. For example, if the fixture is a lock member or a locking rod, a socket or a concave portion can be respectively provided on the first input module 30 and the second input module 40 for fixing the lock member or the locking rod.

Preferably, the base casing 20 further comprises an eject switch 23, which can be connected to the fixture. When the eject switch 23 is applied with force, such as when the user presses the eject switch 23, the fixture can be released (or detached), such that the eject switch 23 ejects the first input module 30 or the second input module 40 and the first input module 30 or the second input module 40 would be detached from the containing portion 21. As shown in FIG. 3, which uses the second input module 40 as an example, after the second input module 40 is taken out, the first input module 30 can be disposed thereon in place of the second input module 40 by means of corresponding the second connecting portion 34 of the first input module 30 to the first connecting portion 22 of the containing portion 21. In other embodiments, the eject switch can also be disposed on the first input module, the second input module or other location without limiting the scope of the present invention.

Figure 4:
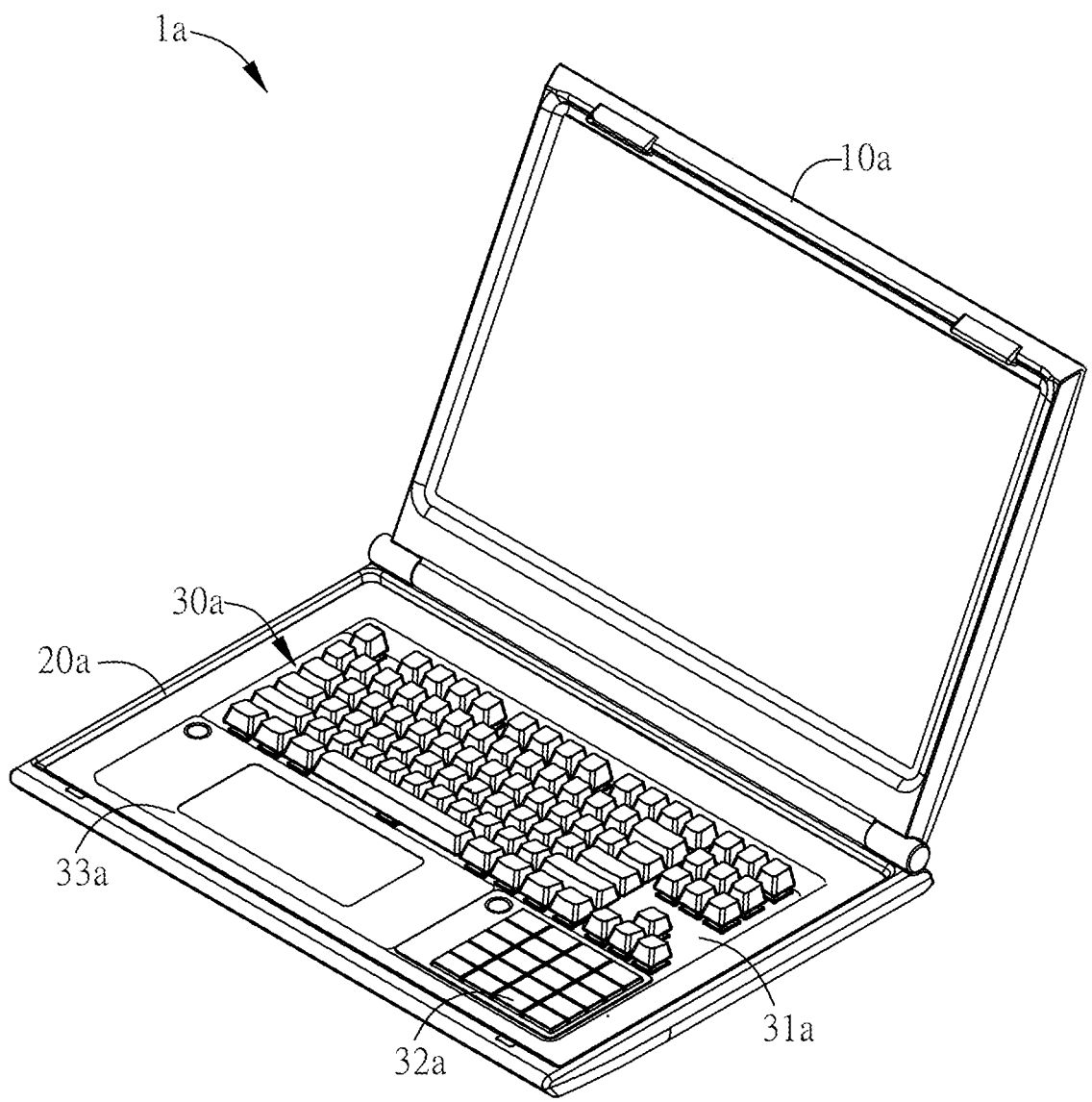
FIG. 4 and FIG. 5 illustrate schematic drawings of the portable electronic apparatus according to a second embodiment of the present invention.
Figure 5:
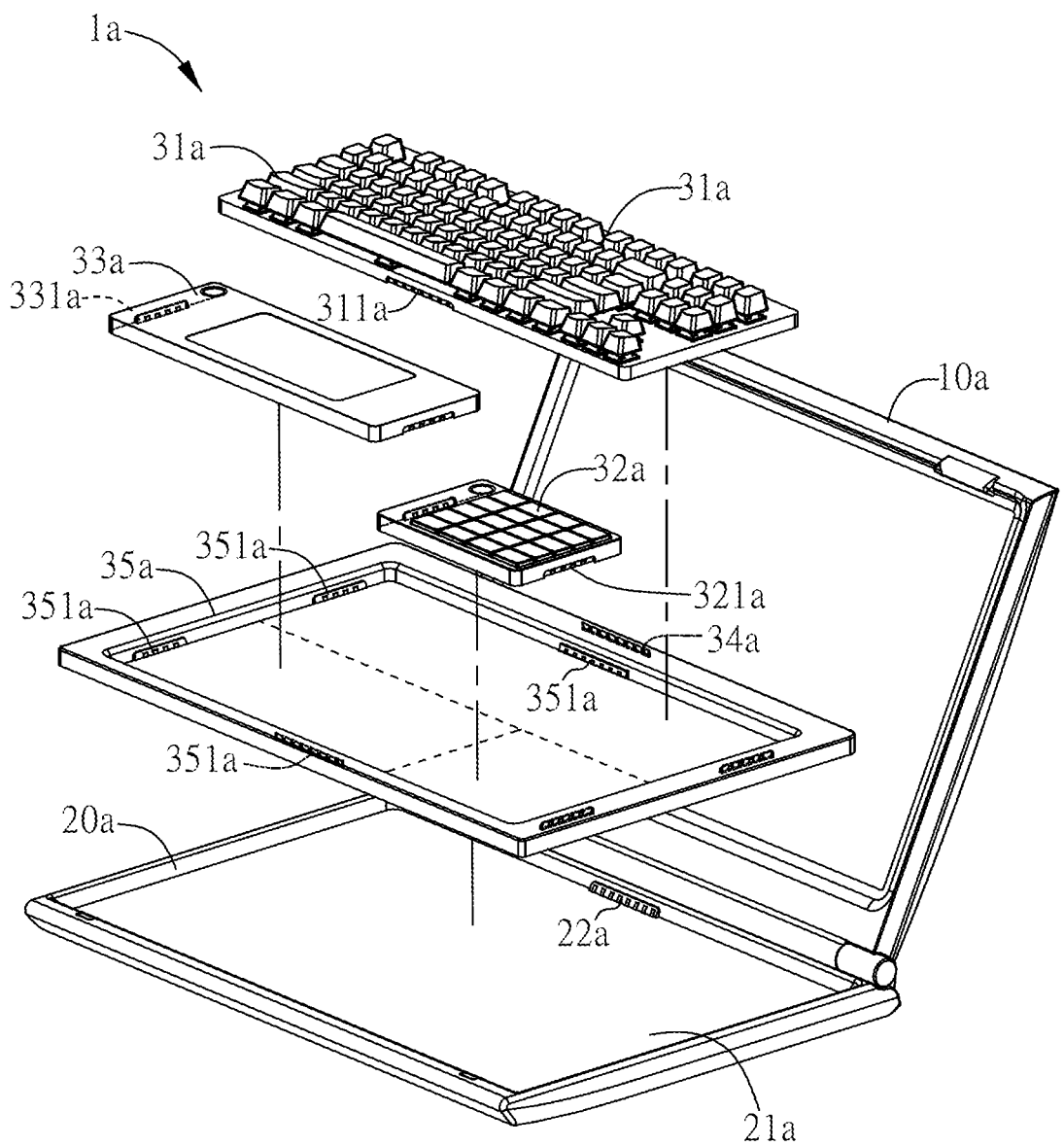
Figure 6:
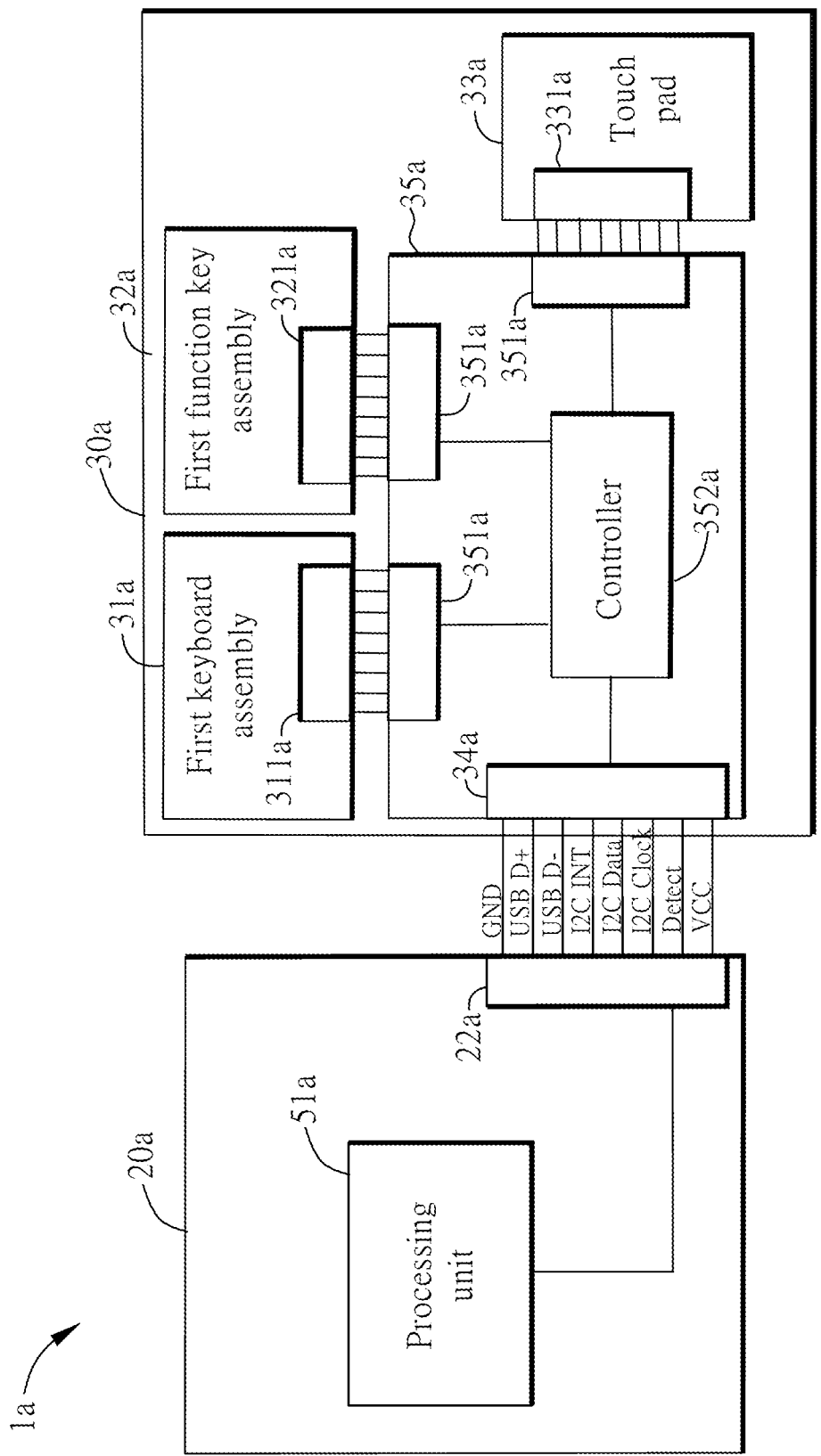
FIG. 6 illustrates a block diagram of the portable electronic apparatus as shown in FIG. 5.

Please refer to FIG. 4, FIG. 5 and FIG. 6. FIG. 4 and FIG. 5 illustrate schematic drawings of the portable electronic apparatus according to a second embodiment of the present invention; and FIG. 6 illustrates a block diagram of the portable electronic apparatus as shown in FIG. 5. As shown in FIG. 4, FIG. 5 and FIG. 6, the status of the first input module 30a disposed on the base casing 20a is illustrated as an example for detailed explanation. Preferably, the first input module 30a (or the second input module) of the portable electronic apparatus 1a of this embodiment is a modular assembly. That is, the first input module 30a can be composed of a plurality of detachable input assemblies. Specifically speaking, the first input module 30a of this embodiment comprises a first keyboard assembly 31a including character input keys, a first function assembly 32a including a plurality function keys used as a number pad, and another first function assembly 33a used as a touch pad, which therefore constitute the first input module 30a. Please note that the first keyboard assembly 31a can be, but not limited to, a membrane type keyboard or a mechanical type keyboard, while a mechanical type keyboard is illustrated in FIG. 4 and FIG. 5 as an example. Preferably, the first input module 30a of this embodiment further comprises a first connecting member 35a, which likewise has a concave portion similar to that of the containing portion 21a for placing the first keyboard assembly 31a and the first function assemblies 32a, 33a. The user can dispose, according to preferences, the first keyboard assembly 31a and the first function assemblies 32a, 33a on the first connecting member 35a according to different arrangements and combinations, and then dispose the first containing member 35a on the base casing 20a.

In this embodiment, the second connecting portion 22a is disposed on an outer wall of the first connecting member 35a, and an inner wall of the first connecting member 35a further comprises a plurality of fourth connecting portions 351a. Moreover, the first connecting member 35a further comprises a controller 352a, which is electrically connected to the second connecting portion 34a and the fourth connecting portions 351a, such that the first connecting member 35a and its controller 352a can jointly constitute a hub.

Specifically speaking, the first keyboard assembly 31a and the first function assemblies 32a, 33a respectively have a fifth connecting portion 311a, 321a and 331a, each located on the side wall of each of the input assemblies as shown in FIG. 5. Preferably, the first keyboard assembly 31a and the first function assemblies 32a, 33a can also have a plurality of fifth connecting portions 311a, 321a, 331a, such that the user can adjust the location of each of the assemblies according to preferences. For example, the fifth connecting portion 311a can be disposed on both of the two relatively long-edge side walls of the first keyboard assembly 31a, such that the user can dispose the first keyboard assembly 31a on either the front side or the rear side of the first connecting member 35a according to preferences.

Figure 7:
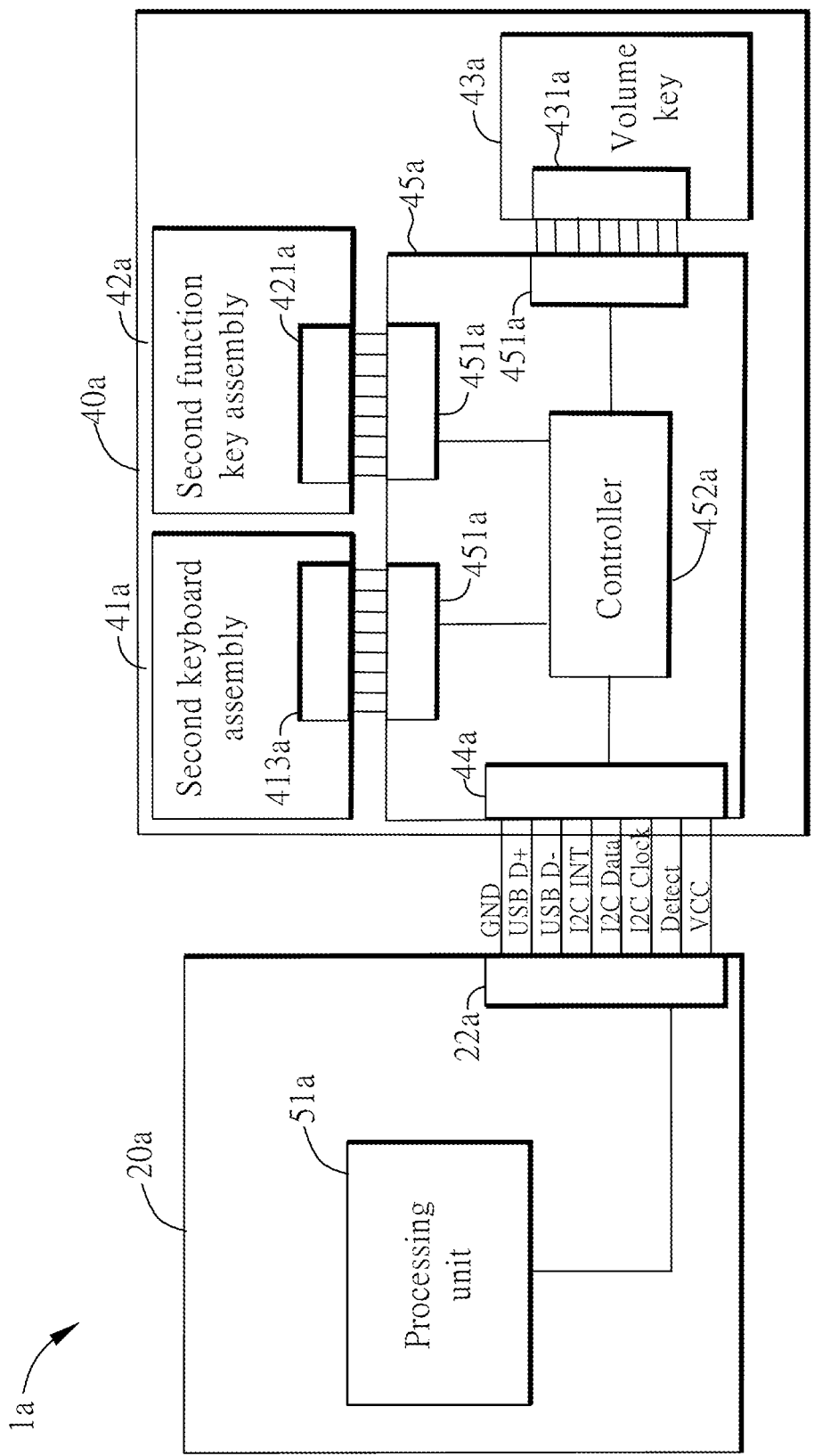
FIG. 7 illustrates a block diagram showing the portable electronic apparatus replaced with a second input module according to the second embodiment of the present invention.

Similarly, the fourth connecting portions 351a and the fifth connecting portions 311a, 321a, 331a are male/female connectors, such that when the first keyboard assembly 31a and the first function assemblies 32a, 33a are disposed on the first connecting member 35a, the fifth connecting portions 311a, 321a, 331a can be electrically connected to the fourth connecting portions 351a. When the first keyboard assembly 31a and the first function assemblies 32a, 33a are disposed on the first connecting member 35a, each of the fifth connecting portions 311a, 321a, 331a is respectively and electrically connected to the fourth connecting portion 351a of the first connecting member 35a. The controller 352a can be used for determining physical keys (including physical keys of the first keyboard assembly 31a or the first function assembly 32a) of the first input module 30a being pressed or an area of the first function assembly 33a (i.e. touch panel) of the first input module 30a being touched, and for processing data input generated from pressing keys or touching the first function assembly 33a (i.e. touch panel), in order to output signals. Similarly, in this embodiment, the outputted signal is transmitted to the processing unit 51a via the second connecting portion 34a and the first connecting portion 22a. The processing unit 51a determines and executes an instruction or execution mode corresponding to the outputted signal. Please refer to FIG. 7, which illustrates a block diagram showing the portable electronic apparatus replaced with a second input module according to the second embodiment of the present invention. As shown in FIG. 7, the status of the second input module 40a disposed on the base casing 20a is illustrated as an example for detailed explanation. Similarly, the second input module 40a is composed of different input assemblies (such as the second keyboard assembly 41a, the second function assembly 42a (including a plurality of function keys in this embodiment) and another second function assembly 43a (including a volume key in this embodiment)) and a second connecting member 45a. Further, the second connecting member 45a comprises the third connecting portion 44a and a plurality of sixth connecting portions 451a. The second keyboard assembly 41a and the second function assemblies 42a, 43a respectively have a seventh connecting portion 413a, 421a and 431a. The second connecting member 45a also comprises a controller 452a, which is electrically connected to the third connecting portion 44a and the sixth connecting portions 451a, such that the second connecting member 45a and its controller 452a can jointly constitute a hub. Similarly, the user can, according to preferences, dispose the second keyboard assembly 41a and the second function assemblies 42a, 43a on the second connecting member 45a, such that each of the seventh connecting portions 413a, 421a and 431a is respectively and electrically connected to the sixth connecting portion 451a of the second connecting member 45a, and thus the signal can be transmitted to the processing unit 51*a* of the portable electronic apparatus 1*a* via the controller 452*a* and the third connecting portion 44*a*.

Preferably, different types of input assemblies have the same connecting portions; that is, the seventh connecting portions 413*a*, 421*a*, 431*a* are identical to the fifth connecting portion 311*a*, 321*a*, 331*a*, wherein the connecting portions of their corresponding connecting members are also the same, which means the sixth connecting portions 451*a* are identical to the fourth connecting portions 351*a*, so they can share the same connecting member (i.e. the first connecting member 35*a* or the second connecting member 45*a*). In other words, the first connecting member 35*a* and the second connecting member 45*a* substantially can be the same component, which respectively constitute the first input module 30*a* or the second input module 40*a* according to different types of input assemblies being installed.

According to the aforementioned description, the portable electronic apparatus of the present invention comprises a first input module and a second input module, which respectively have different types of keyboard assemblies. The base casing of the portable electronic apparatus comprises a containing portion and a first connecting portion, so that the first input module and the second input module can be disposed on the containing portion interchangeably in order to execute different functions, thereby providing a portable electronic apparatus applicable for achieving functions of multiple types of keyboards and allowing the user to interchangeably use the keyboards according to different purposes. Moreover, the portable electronic apparatus is easy-to-fold as well as convenient-to-carry. For example, when the first input module is disposed on the containing portion, the second connecting portion of the first input module is electrically connected to the first connecting portion, such that the user can use the first input module to perform document processing operations; when the second input module is disposed on the containing portion, the third connecting portion of the second input module is electrically connected to the first connecting portion, such that the user can use the second input module to play games.

Although the present invention has been explained in relation to its preferred embodiments, it is to be understood that many other possible modifications and variations can be made without departing from the spirit and scope of the invention as hereinafter claimed.

What is claimed is:

1. A portable electronic apparatus, comprising:
    a cover casing;
    a base casing, pivoted to the cover casing, wherein the base casing includes a containing portion and at least one first connecting portion, the containing portion is located on a surface of the base casing with the surface facing the cover casing, and the first connecting portion is disposed on the containing portion; and
    a first input module and a second input module, disposed on the containing portion interchangeably, the first input module comprises a first keyboard assembly, a first function assembly and a first connecting member, the second input module comprises a second keyboard assembly and a second function assembly, wherein the first connecting member has at least one second connecting portion and a plurality of fourth connecting portions, the second input module has at least one third connecting portion, the second connecting portion is the same member as the third connecting portion, the first keyboard assembly and the first function assembly respectively have a fifth connecting portion, the first keyboard assembly and the first function assembly are disposed on the first connecting member, and each of the fifth connecting portions is respectively and electrically connected to one of the plurality of the fourth connecting portions;
    wherein when the first input module is disposed on the containing portion, the second connecting portion is electrically connected to the first connecting portion; and when the second input module is disposed on the containing portion, the third connecting portion is electrically connected to the first connecting portion.

2. The portable electronic apparatus as claimed in claim 1, wherein the first connecting portion, the second connecting portion and the third connecting portion are pogo pin connectors.

3. The portable electronic apparatus as claimed in claim 2, wherein the first connecting portion has a single pin type spring, and the second connecting portion and the third connecting portion respectively have a metal spring.

4. The portable electronic apparatus as claimed in claim 1, wherein the base casing further comprises an eject switch, when the eject switch is applied with force, the eject switch ejects the first input module or the second input module from the containing portion.

5. The portable electronic apparatus as claimed in claim 1, wherein the second input module comprises a second connecting member, the second connecting member has the third connecting portion and a plurality of sixth connecting portions, the second keyboard assembly and the second function assembly respectively have a seventh connecting portion, the second keyboard assembly and the second function assembly are disposed on the second connecting member, and each of the seventh connecting portions is respectively and electrically connected to the sixth connecting portion.

6. The portable electronic apparatus as claimed in claim 5, wherein the first connecting member is the same member as the second connecting member.

7. The portable electronic apparatus as claimed in claim 1, wherein the first input module is a membrane keyboard, and the second input module is a gaming mechanical keyboard.

8. A portable electronic apparatus, comprising:
    a cover casing;
    a base casing, pivoted to the cover casing, wherein the base casing includes a containing portion and at least one first connecting portion, the containing portion is located on a surface of the base casing with the surface facing the cover casing, and the first connecting portion is disposed on the containing portion; and
    a first input module, detachably disposed on the containing portion, the first input module comprises a first keyboard assembly, a first function assembly and a first connecting member, wherein the first connecting member has at least one second connecting portion and a plurality of fourth connecting portions, the first keyboard assembly and the first function assembly respectively have a fifth connecting portion, the first keyboard assembly and the first function assembly are disposed on the first connecting member, and each of the fifth connecting portions is respectively and electrically connected to one of the plurality of the fourth connecting portions, when the first input module is disposed on the containing portion, the second connecting portion is electrically connected to the first connecting portion.

9. The portable electronic apparatus as claimed in claim 8, wherein the first input module comprises a keyboard controller which is electrically connected to the second connecting portion, and the keyboard controller is also electrically connected to the first function assembly for outputting signals.

* * * * *